(12) United States Patent
Ong et al.

(10) Patent No.: US 6,717,775 B2
(45) Date of Patent: Apr. 6, 2004

(54) INTEGRATED LATCH/VOICE-COIL-MOTOR MAGNET ASSEMBLY

(75) Inventors: BoonSeng Ong, Singapore (SG); WaiOnn Chee, Singapore (SG); Niroot Jierapipatanakul, Singapore (SG); KokTong Soh, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 325 days.

(21) Appl. No.: 09/815,748

(22) Filed: Mar. 23, 2001

(65) Prior Publication Data

US 2003/0206377 A1 Nov. 6, 2003

Related U.S. Application Data

(60) Provisional application No. 60/212,543, filed on Jun. 20, 2000.

(51) Int. Cl.[7] .............................. G11B 5/54; G11B 21/22
(52) U.S. Cl. ............................................ 360/256.2
(58) Field of Search ........................... 360/256, 256.2

(56) References Cited

U.S. PATENT DOCUMENTS

| | | | |
|---|---|---|---|
| 5,034,837 A | | 7/1991 | Schmitz |
| 5,305,169 A | * | 4/1994 | Anderson et al. ......... 360/256.2 |
| 5,455,728 A | | 10/1995 | Edwards |
| 5,712,750 A | | 1/1998 | Kim |
| 5,717,548 A | | 2/1998 | Koester et al. |
| 5,729,405 A | * | 3/1998 | Isomura et al. .......... 360/256.2 |
| 5,734,527 A | | 3/1998 | Reinhart |
| 5,812,346 A | * | 9/1998 | Williams et al. ......... 360/256.2 |
| 5,956,213 A | * | 9/1999 | Dague et al. ............ 360/256.2 |
| 6,115,222 A | | 9/2000 | Andrews |
| 6,147,841 A | * | 11/2000 | Rao ....................... 360/256.2 |

\* cited by examiner

Primary Examiner—David Ometz
(74) Attorney, Agent, or Firm—Derek J. Berger

(57) ABSTRACT

The present invention provides an integrated magnetic latch and voice coil motor magnet assembly for use in a disc drive. The lower plate of the voice coil motor defines an elongate slot that is configured for engagement with a latch member. The latch member has a step at one end. The lower plate has a magnet fixed on one surface such that the step is brought into abutment with another surface of the base when the latch member is attracted by the magnet.

13 Claims, 4 Drawing Sheets

INTEGRATED LATCH/VOICE-COIL-MOTOR MAGNET ASSEMBLY

RELATED APPLICATION

The present application claims benefit of the U.S. provisional patent application No. 60/212,543, filed Jun. 20, 2000.

FIELD OF THE INVENTION

The present invention relates generally to disc drives, and more particularly, but not by way of limitation, to an improved latch assembly for restraining the motion of an actuator in a disc drive.

BACKGROUND OF THE INVENTION

Disc drives of the type where data is recorded on the surfaces of a plurality of discs are well known in the industry. Data is recorded in circular, concentric tracks on the discs, and an actuator assembly is used to move read/write heads to the chosen track for read/write operations. A typical rotary voice coil actuator consists of a pivot shaft fixedly attached to the base of the disc drive housing with the actuator housing rotatably mounted to the pivot shaft by bearings. One side of the actuator housing is a yoke supporting a coil in the magnetic field of a permanent magnet. The other side of the actuator extends into a plurality of actuator arms ending in the read/write heads. The actuator housing rotates when controlled current is provided to the coil, thereby positioning the read/write heads to the desired track. When power to the disc drive is lost or when the disc drive is not in operation, some means of restraining the rotation of the actuator arms is necessary so as to avoid damage to the disc surfaces or to the read/write heads. One known way is to move the read/write heads to a parking zone and to latch the actuator in that position until power is restored to the disc drive.

One conventional latching system involves a first latch member that is fixed relative to the base of the disc drive housing and a second latch member that is attached to the yoke of the actuator. The second latch member is thus capable of travelling in a substantially horizontal arcuate path about the pivot shaft. The first latch member is generally vertical and located near the permanent magnet of the voice coil magnet assembly so that it is capable of holding the second latch member by magnetic attraction when the disc drive is not in operation. The first member also forms part of the voice coil motor (VCM) magnet assembly in that it is fixed between an upper plate and a lower plate of the VCM. The permanent magnet is usually bonded to the lower plate which in turn is mounted to the base of the disc drive housing. The coil of the VCM moves within a gap between the permanent magnet and the upper plate.

The conventional way of assembling the first latch member involves first mounting the lower plate to the base of the disc drive housing. The lower plate includes a hole extending generally downward, into which a rod-like lower end of the first latch member is loosely inserted from the top. The actuator assembly has to be next mounted to the base of the disc drive housing before the upper plate is fitted on. A hole or a recess in the lower surface of the upper plate serves to locate the upper end of the first latch member. It is only when the upper plate is attached that the first latch member is secured in place. Before that assembly step, the first latch member tends to drop out of the rectangular hole either because it is attracted by the permanent magnet or because of the vibrations suffered in its travel to subsequent assembly stations.

Attempts to overcome this problem includes providing a threaded lower end for the first latch member so that it can be directly screwed into the lower plate or to the base of the disc drive housing, as shown in FIG. 8 of the U.S. Pat. No. 6,115,222 issued to Andrews et al. on Sep. 5, 2000.

As designers look for cheaper and faster alternatives to using screw attachments, the use of interference fit has been explored. This involves having small lateral protrusions at the lower end of the first latch member so that there is an interference fit with a hole in the lower plate of the VCM as the first latch member is driven downwards into the hole. Although this has the advantage of enabling the VCM supplier to provide the disc drive manufacturer with a lower plate that is pre-assembled with the first latch member, special tooling will be needed to fit the first latch member into the hole in the lower plate. In addition, it is suspected that such a fitting introduces particles into the disc drive environment, and may be detrimental to disc drive performance.

There is therefore a need for an improved first latch member and VCM assembly that can be assembled with greater ease and at lower cost.

SUMMARY OF THE INVENTION

The present invention relates to a disc drive component that is part of a magnetic latch as well as part of a voice coil motor (VCM) magnet assembly.

The present invention provides for an assembly for use in a disc drive. According to a most preferred embodiment, the assembly includes a lower plate which defines an elongate slot. The lower plate has a magnet fixed on one surface of the base. The assembly also includes a first latch member that has a stem which is meant for engagement with the elongate slot. The stem ends off at one end in a step which is brought into abutment with another surface of the base when the first latch member is attracted by the magnet. According to one embodiment of the present invention, the elongate slot has an opening at a side of the lower plate for receiving the stem into the elongate slot. According to another embodiment, the elongate slot does not lead to an opening in the side of the lower plate, but may used in conjunction with a first latch member that has a step with an elongate cross-section. The elongate slot may further include at least one bend for locating the stem in abutment with an end of the elongate slot nearer the magnet.

The present invention avoids the need for screw attachment or force fitting. In addition, the assembly of an upper plate with the lower plate is not necessary to prevent the first latch member from dropping out of engagement with the lower plate. That is, the first latch member can be pre-assembled with the lower plate by the VCM supplier before it is assembled with the rest of the disc drive components by the disc drive manufacturer. These and various other features as well as advantages which characterize the present invention will be apparent upon reading of the following detailed description and review of the associated drawings.

DETAILED DESCRIPTION

Figure 1:
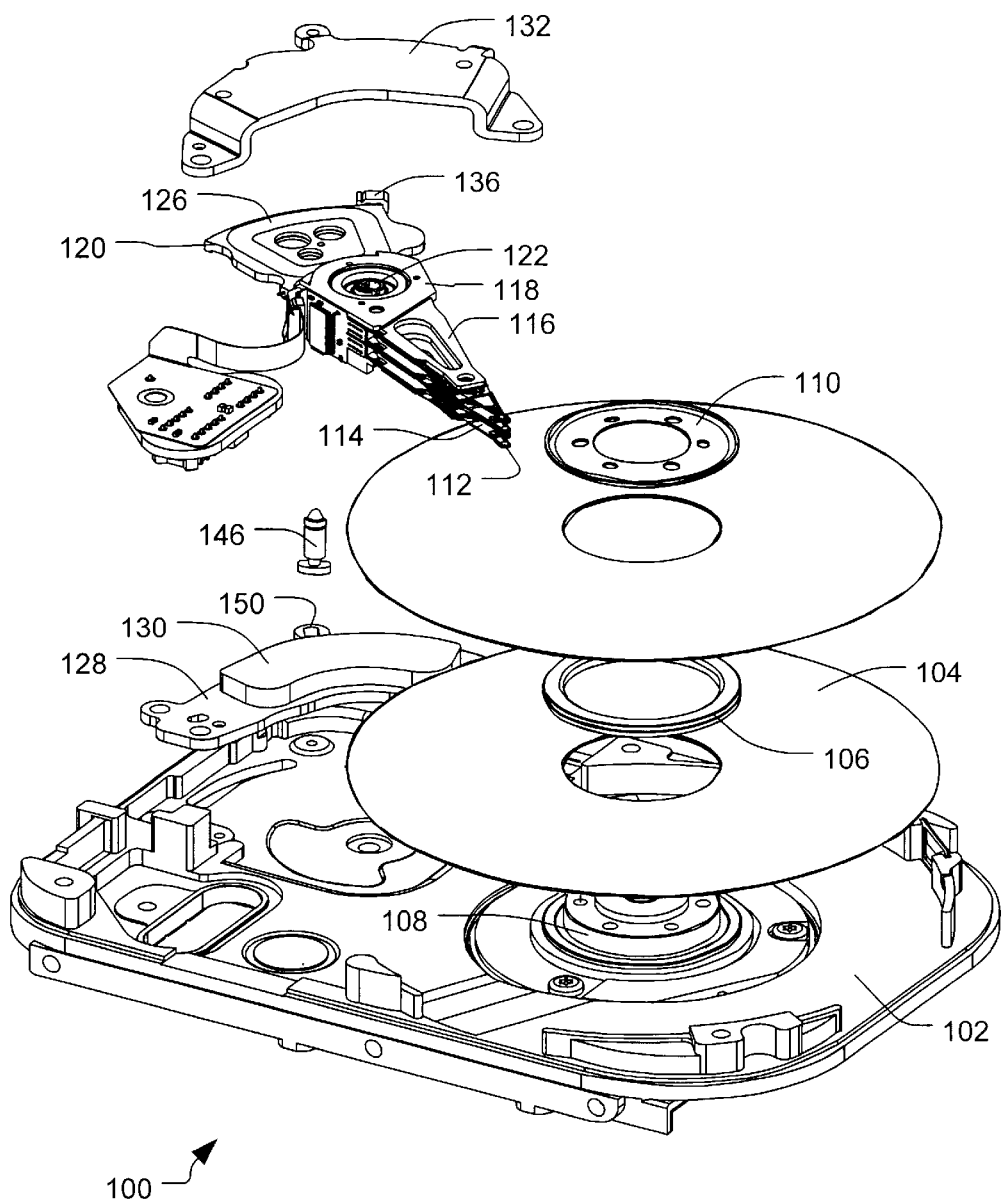
FIG. 1 shows a disc drive in which the present invention can be used.

Referring to FIG. 1, various components of a disc drive 100 are shown. The components are mounted directly or indirectly to a baseplate 102 which forms part of the disc drive enclosure. A plurality of discs 104, kept apart by one or more spacers 106, are clamped to a spindle motor 108 by means of a disc clamp 110. Data is read from or written to the discs 104 by read/write heads 112 supported by flexures 114 at the ends of actuator arms 116. The actuator arms 116 extend from one side of the housing of an actuator 118 while a yoke 120 extends from the other side. The actuator 118 is fixed to the sleeve of a pivot cartridge 122 for rotational motion about the pivot shaft which in turn is fixedly mounted to the baseplate 102.

Rotation of the actuator 118 is effected though a voice coil motor (VCM). The VCM includes a magnet 130 that is bonded to a lower plate 128 and a coil 126 that is supported by the yoke 120 of the actuator 118. Various types of magnet assemblies may be used in the disc drive 100. The magnet assembly shown in FIG. 1 includes a lower plate 128 which is fixedly mounted to the baseplate 102. A raised upper plate 132 is configured such that when assembled to the lower plate 128, a gap is formed between the magnet 130 and the upper plate 132. The coil 126 is positioned in that gap so that when current flows in the coil 126, electromotive forces generated causes the actuator 118 to rotate, thereby moving the read/write heads 112 to the desired position.

A latch is provided to keep the read/write heads 112 within a designated parking zone when power is lost from the disc drive 100. Such a latch may comprise a first latch member 146 that is fixed in relation to the baseplate 102 and a second latch member 136 that is fixed to the yoke 120 of the actuator 118. The first latch member 146 is positioned near to the magnet 130 such that the second latch member 136 is held by the first latch member 146 by a magnetic attraction force. The first latch member 146 as shown in FIG. 1 includes a lower end that is configured to fit within an opening 150 in the lower plate 128 of the VCM.

Figure 2:
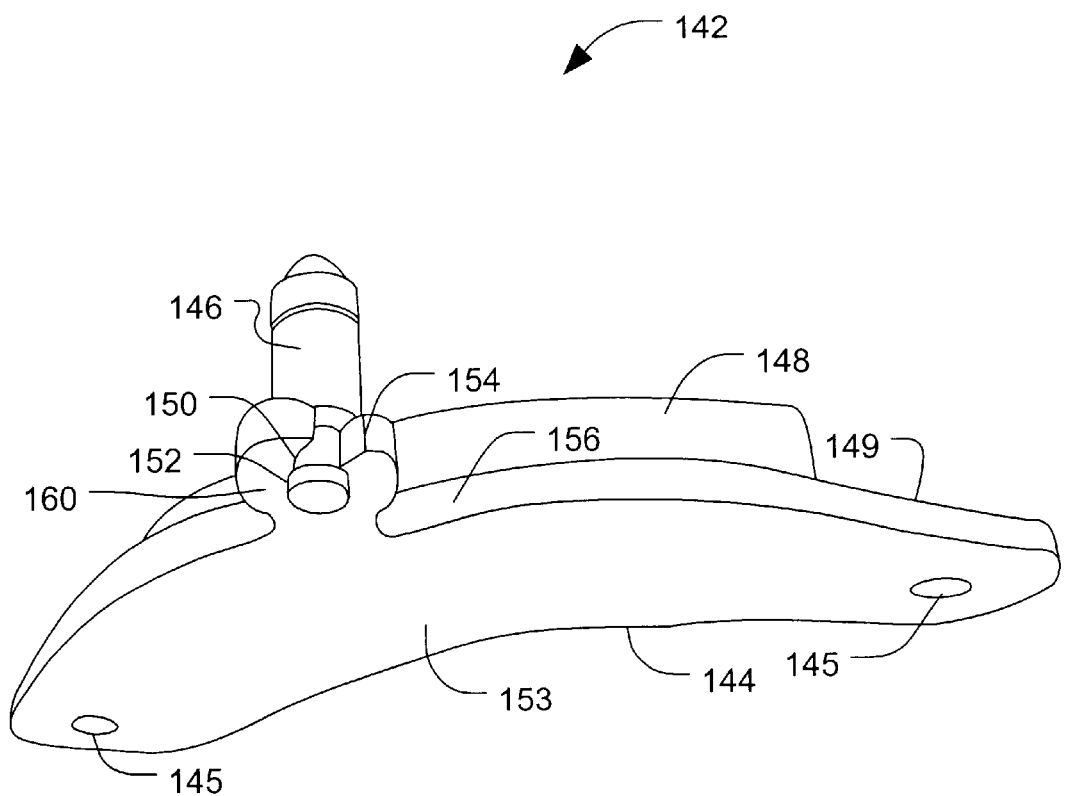
FIG. 2 shows an assembly according to a most preferred embodiment of the present invention.

FIG. 2 shows a most preferred embodiment of an assembly 142 according to the present invention. A lower plate 144 of a VCM is formed with attachment points 145 for mounting to the baseplate 102 of the disc drive 100. A permanent magnet 148 is bonded to one surface 149 of the lower plate 144. An elongate slot 150 in the lower plate 144 and a first latch member 146 are configured for slip fit engagement with each other. When in assembly with the lower plate 144, the first latch member 146 is attracted by the magnet 148, and yet prevented from slipping out of the elongate slot 150 by the abutment of a step 152 against a second surface 153 of the lower plate 144.

Figure 3:
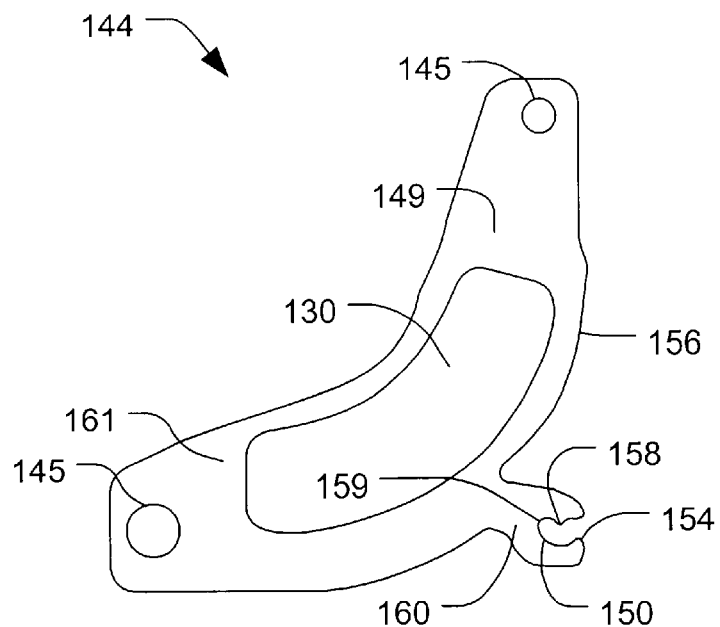
FIG. 3 is a plan view of the lower plate of FIG. 2.

A top view of the lower plate 144 of FIG. 2 is shown in FIG. 3. The elongate slot 150 preferably has an opening 154 on one side 156 of the lower plate 144. The elongate slot 150 extends generally inwards towards the magnet 148. The elongate slot 150 may be of substantially the same width throughout its length. It preferably includes a bend 158 to help locate the first latch member 146 against the end 159 of the elongate slot 150. The bend 159 may also prevent the first latch member 146 from dropping out of engagement with the lower plate 144 if the assembly 142 encounters a shock that is directed to knock the first latch member 146 away from the magnet 148.

The lower plate 144 may include an arm 160 extending from the body 161 of the lower plate 144, with the elongate slot 150 located in the arm 160. The corners at the opening 154 and at the bend 158 of the elongate slot 150 are smoothed or chamfered to allow the first latch member 146 to travel easily to the end 159 of the elongate slot 150.

Figure 4:
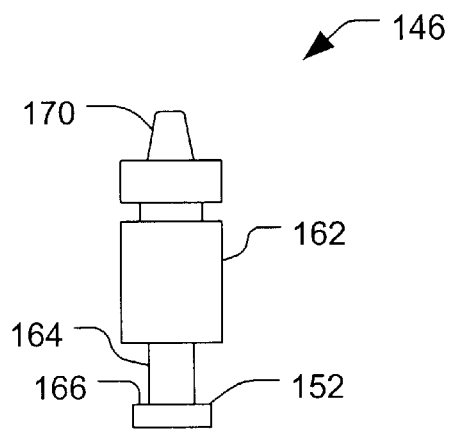
FIG. 4 is a side view of the first latch member of FIG. 2.

A most preferred embodiment of the first latch member 146 is illustrated in FIG. 4. The first latch member 146 includes a body 162 that extends into a stem 164. The stem 164 and the elongate slot 150 are sized for sliding engagement. In assembly, the first latch member 146 is located by the bend 158 against the end 159 of the elongate slot 150. At the end of the stem there is a step 152 that provides a surface 166 for abutment against the lower surface 153 of the lower plate 144 when the first latch member 146 and the lower plate 144 are in assembly. Preferably, the stem 164 is narrower than the body 162 so that the stem 164 serves as a guide for vertical alignment relative to the lower plate 144. The upper end 170 of the first latch member 146 is configured for locating a hole or a recess in the lower surface of the upper plate 132 when the magnet assembly is put together. Preferably, the upper end 170 may be conical in shape to facilitate assembly. Preferably, the body 162, the stem 164 and the step 152 of the first latch member 146 are cylindrical so as to allow for easy manufacture. The first latch member 162 as shown has a stem 164 of smaller diameter than the body 162, but it is conceivable that the stem 164 may be of the same diameter as the body 162.

Figure 5:
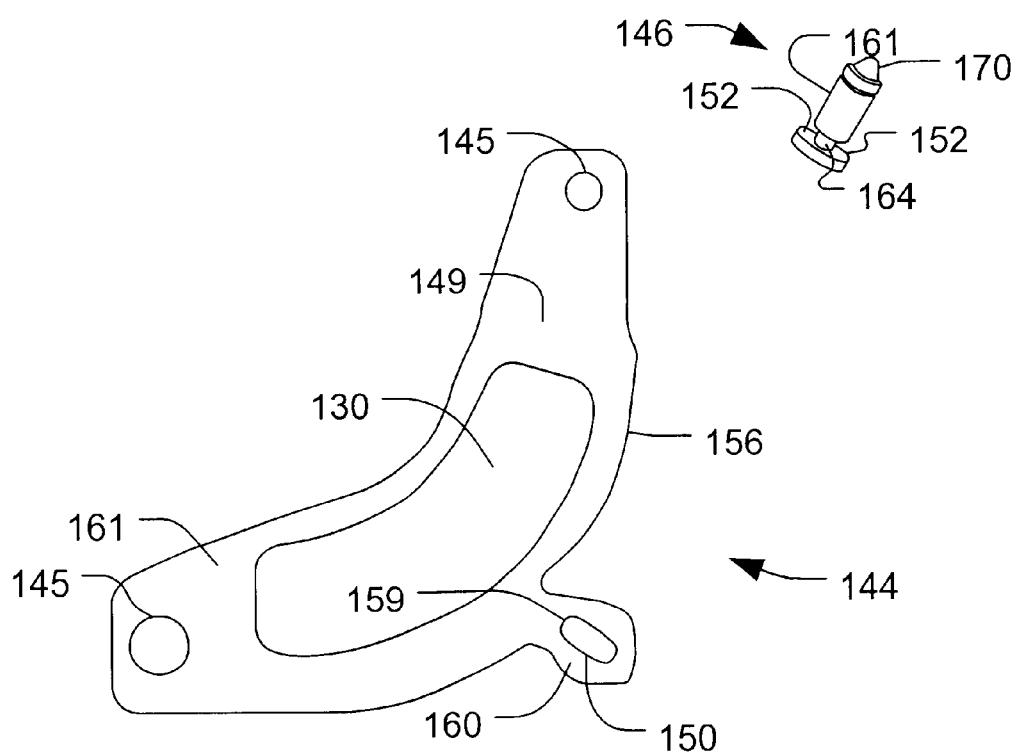
FIG. 5 shows an alternative embodiment of the present invention.

An alternative embodiment is illustrated in FIG. 5. The elongate slot 150 in this embodiment is closed and does not have an opening at the side of the lower plate 144. The first latch member 146 has a stem 164 that is narrower than the elongate slot 150. The step 152 is elongated in shape, and may have an oval, rectangular or some other elongated cross-section. The step 152 is shaped such that it can be inserted through the elongate slot 150 in one aligned orientation. During the assembly process, the first latch member 146 is oriented so that the step 152 is in the aligned orientation with respect to the elongate slot 150. The first latch member 146 is inserted through the elongate slot 150 until the step 152 clears the lower plate 144, thereupon the first latch member 146 is rotated so that the step 152 is no longer aligned with the elongate slot 150. In this mis-aligned orientation, the step 152 comes into abutment with the lower surface 153 of the lower plate 144 while the first latch member 146 is attracted towards the magnet 130, thus preventing the first latch member 146 from dropping out of engagement with the lower plate 144.

Alternatively, embodiments of the present invention may be described as follows:

The present invention provides for an assembly 142 for use in a disc drive 100. The assembly 142 includes a base 144 which defines an elongate slot 150. The base 144 has a magnet 130 fixed on a first surface 149 of the base 144. The assembly 142 also includes a latch member 146 that has a stem 164 which is meant for engagement with the elongate slot 150. The stem 164 ends off at one end in a step 152. The step 152 is brought into abutment with a second surface 153 of the base 144 when the first latch member 146 is attracted by the magnet 130.

According to one embodiment of the present invention, the elongate slot 150 has an opening 154 at a side 156 of the base 144 for receiving the stem 164 into the elongate slot 150. The elongate slot 150 may further include a bend 158 for locating the stem 164 in abutment with one end 159 of the elongate slot 150. In one embodiment, the step 152 may have an elongate cross-section.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the cross-sectional shape of the first latch member may vary while maintaining substantially the same functionality without departing from the scope and spirit of the present invention. It will also be understood that the present invention encompasses the case where the elongate slot includes more than one bend of variable angles. In addition, although the preferred embodiment described herein is directed to the assembly of a first latch member to a lower plate of a VCM magnet assembly, it will be appreciated by those skilled in the art that the teachings of the present invention can be applied to other systems, without departing from the scope of the present invention.

What is claimed is:

1. An assembly comprising:
   a base defining an elongate slot, the base having a first surface and a second surface;
   a magnet fixed on the first surface of the base; and
   a latch member comprising:
      a latch portion configured to engage a movable actuator;
      a stem attached at a proximal end to the latch portion and configured for engagement with the elongate slot; and
      a step at a distal end of the stem wherein the step is wider than the stem and is brought into abutment with the second surface of the base when the latch member is attracted by the magnet.

2. The assembly of claim 1 wherein the elongate slot further includes an opening at a side of the base for receiving the stem into the elongate slot.

3. The assembly of claim 1 wherein the elongate slot further comprises:
   an end; and
   a bend configured to locate the stem in abutment with the end.

4. An assembly of claim 1 wherein the step has an elongate cross-section.

5. A disc drive comprising:
   a baseplate;
   an actuator housing rotatably mounted to the baseplate, the actuator housing comprising a yoke extending from the actuator housing;
   a voice coil motor comprising:
      a base defining an elongate slot the base having a first surface and a second surface; and
      a magnet fixed on the first surface of the base; and
   a magnetic latch comprising:
      a first latch member, the first latch member comprising:
         a stem configured for engagement with the elongate slot; and
         a step at one end of the stem; the step being configured for abutment
         with the second surface of the base when the first latch member is attracted by the magnet; and
      a second latch member fixed to the yoke, wherein the second latch member is configured for releasable coupling to the first latch member when the disc drive is not in operation.

6. The disc drive of claim 5 wherein the elongate slot further includes an opening at a side of the base for receiving the stem into the elongate slot.

7. The disc drive of claim 5 wherein the elongate slot further comprises:
   an end; and
   a bend configured to locate the stem in abutment with the end.

8. The disc drive of claim 5 wherein the step has an elongate cross-section.

9. A data storage device comprising:
   a storage medium;
   an actuator for accessing the storage medium; and
   the apparatus of claim 1, in which the latch member is configured to hold the actuator in latched position.

10. The data storage device of claim 9, in which the storage medium comprises a rotatable disc.

11. A device comprising:
    a movable actuator;
    a voice coil motor magnet assembly comprising:
       a base; and
       a magnet fixed to the base; and
    a stationary latch member held in position on the base by the magnet, the actuator contacting the latch member when in a latched position.

12. The device of claim 11, further comprising:
    a data storage medium, the actuator being configured to access the data storage medium.

13. The device of claim 12, in which the data storage medium comprises a rotatable disc.

* * * * *